A. Cooper.
Clothes Line Fastener.
N° 95,881. Patented Oct. 19, 1869.
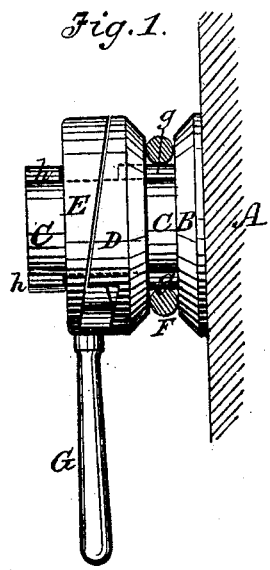
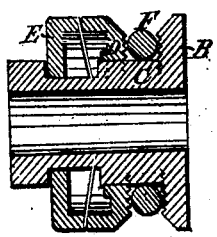
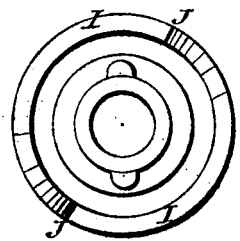
Witnesses:
A. Bennersdorf
Alex. F. Roberts.
Inventor.
A. Cooper
per Munn & Co. attys.

United States Patent Office.

ALBERT COOPER, OF HARRISBURG, PENNSYLVANIA.

Letters Patent No. 95,881, dated October 19, 1869.

---

IMPROVED CLOTHES-LINE HOLDER.

---

The Schedule referred to in these Letters Patent and making part of the same.

---

*To all whom it may concern:*

Be it known that I, ALBERT COOPER, of Harrisburg, in the county of Dauphin, and State of Pennsylvania, have invented a new and useful Improvement in Clothes-Line Holder; and I do hereby declare that the following is a full, clear, and exact description thereof, which will enable others skilled in the art to make and use the same, reference being had to the accompanying drawings, forming part of this specification.

This invention relates to a new and useful device for holding clothes-lines; and consists in arranging two circular disk-wheels on a centre-piece, and pressing the line between two rigid surfaces, and thereby holding it, by means of double-reversed inclined planes on the faces of the disks, as will be hereinafter more fully described.

In the accompanying drawing—

Figure 1 represents a side view of the article complete.

Figure 2 is an inside view of one of the disk-wheels.

Figure 3 is a cross-section of fig. 2 through the line $x\,x$.

Similar letters of reference indicate corresponding parts.

A is a post, or other fixture, to which the line-holder is attached, by screws or otherwise.

B is a collar, which is fast on the centre-piece C.

D is the inside disk-wheel.

E is the outside disk-wheel.

F represents the clothes-line.

G is the lever, which is attached permanently to the outer disk, or it may be inserted in a hole in the edge of the disk, when used for squeezing the line, and be removed therefrom, if desired.

The inside faces of these disks form double inclined planes, reversed, as seen in fig. 1, so that by revolving the outer disk-wheel E, the wheel D will be crowded toward the collar B, and the clothes-line being placed between, as represented, will be squeezed and held tightly, so that it cannot be drawn in either direction.

The inner surfaces of the collar B and the disk D are serrated, so that the line is prevented from slipping.

$g\,g$ are lugs on the centre C, which prevent the disk D from turning round.

$h\,h$ are lugs on the outer end of the centre C, which prevent the outer disk E from slipping off.

I I, fig. 2, represent the incline planes on the face of one of the disks.

J J are offsets or shoulders dividing them.

The faces of these disks are alike, so that the incline planes fit together when the shoulders or offsets J J are in contact with each other.

When the disk-wheel E is revolved, as when in use, its outside will bear against the lugs $h\,h$.

This clothes-line holder is made entirely of cast-iron, or other suitable cast-metal, requiring very little, if any, fitting up.

Its advantages are, that while it may be very cheaply made, it holds the line both ways, when in use, thereby forming a very desirable article for the household or laundry.

Having thus described my invention,

I claim as new, and desire to secure by Letters Patent—

In combination with a line-holder, the double-incline plane disk-wheels E and D, and the centre C with the collar B, constructed, arranged, and operating substantially as described, for the purposes set forth.

ALBERT COOPER.

Witnesses:
GEO. W. SIMMERS,
FR. W. HAAS.